United States Patent [19]

Burgio

[11] 4,329,956
[45] May 18, 1982

[54] DIESEL CYCLE ENGINE HAVING A PRECOMBUSTION CHAMBER

[75] Inventor: Antonio Burgio, Moncalieri, Italy

[73] Assignee: Fiat Auto S.p.A., Turin, Italy

[21] Appl. No.: 121,195

[22] Filed: Feb. 13, 1980

Related U.S. Application Data

[63] Continuation of Ser. No. 930,120, Aug. 1, 1978, abandoned.

[30] Foreign Application Priority Data

Sep. 23, 1977 [IT] Italy .............................. 69100 A/77

[51] Int. Cl.³ .......................................... F02B 19/10
[52] U.S. Cl. .................................. 123/286; 123/259; 123/193 P; 123/256
[58] Field of Search ................... 123/193 P, 286, 267, 123/269, 259, 273, 277, 255, 256

[56] References Cited

U.S. PATENT DOCUMENTS

| | | | |
|---|---|---|---|
| 2,506,768 | 5/1950 | Bentz et al. | 123/273 |
| 3,154,058 | 10/1964 | Warren | 123/267 |
| 3,196,857 | 7/1965 | Zimmermann | 123/269 |
| 3,220,389 | 11/1965 | Rinsum et al. | 123/193 P |
| 3,995,604 | 12/1976 | Brandstetter | 123/277 |
| 4,023,543 | 5/1977 | Ishikawa | 123/286 |
| 4,116,234 | 9/1978 | Yanagihara et al. | 123/259 |
| 4,127,089 | 11/1978 | Tatsumi | 123/255 |

FOREIGN PATENT DOCUMENTS

| | | | |
|---|---|---|---|
| 1037165 | 9/1953 | France | 123/256 |
| 645221 | 3/1948 | United Kingdom | 123/256 |

*Primary Examiner*—P. S. Lall
*Attorney, Agent, or Firm*—Sughrue, Mion, Zinn, Macpeak & Seas

[57] ABSTRACT

A diesel cycle internal combustion engine has at least one cylinder and a precombustion chamber formed by a cavity in a metal insert in the cylinder head of the engine the precombustion chamber being formed in two coaxial generally cylindrical parts the first part being larger than the second and situated upstream thereof in relation to the flow of fuel through the precombustion chamber from a fuel injector which closes one end; the two parts of the precombustion chamber are joined by a frusto-conical section with rounded regions where it joins the first part of the precombustion chamber, and the second part of the precombustion chamber communicates with a duct which leads to the combustion chamber of the cylinder.

1 Claim, 3 Drawing Figures

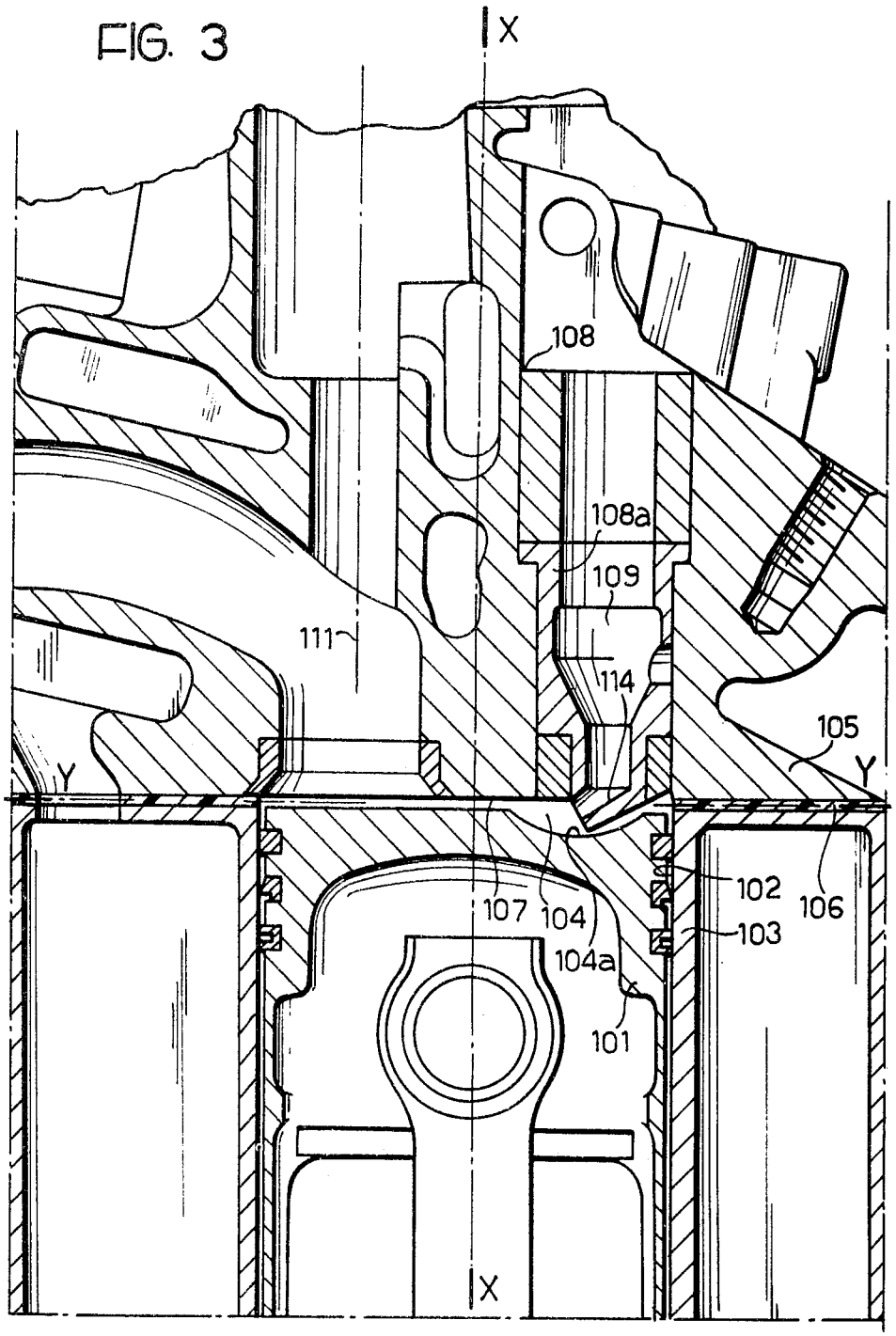

DIESEL CYCLE ENGINE HAVING A PRECOMBUSTION CHAMBER

This is a continuation of application Ser. No. 930,120, filed Aug. 1, 1978, now abandoned.

The present invention relates to a diesel cycle internal combustion engine of the type having a precombustion chamber, in which the precombustion chamber is formed by a cavity situated in the cylinder head of the engine, the top of which cavity is closed by the body of the injector. An opening for a glow plug may communicate with this cavity to allow for preheating the air in the precombustion chamber and possibly also the combustion chamber of the engine.

Engines having this type of cylinder head arrangement are known, usually being high speed motors, but these are unfortunately characterised by very "hard" running and by a persistent "throbbing" both of which disadvantages, up till now, it has not been possible totally to eliminate.

The present invention seeks to provide an internal combustion engine of the general type described above in which, because of a carefully selected proportioning and the particular shape of the precombustion chamber the abovementioned disadvantages of known compression-ignition engines with precombustion chambers are significantly reduced if not entirely eliminated.

According to the present invention there is provided a diesel cycle internal combustion engine of the type having a precombustion chamber formed by a cavity in a metal insert carried by the cylinder head, which cavity is closed at one end by the body of the injector, in which the precombustion chamber is formed in two parts the first of which is of substantially cylindrical form having a frusto-conical portion at the downstream end where it communicates with the second part which is also of substantially cylindrical form and which communicates with a duct for the discharge of gases produced as a result of combustion in the precombustion chamber.

Various embodiments of the present invention will now be more particularly described, by way of example, with reference to the accompanying drawings, in which:

FIG. 3 is a schematic cross-sectional view, similar to FIG. 1, of part of an internal combustion engine formed as a further embodiment of the invention.

Figure 1:
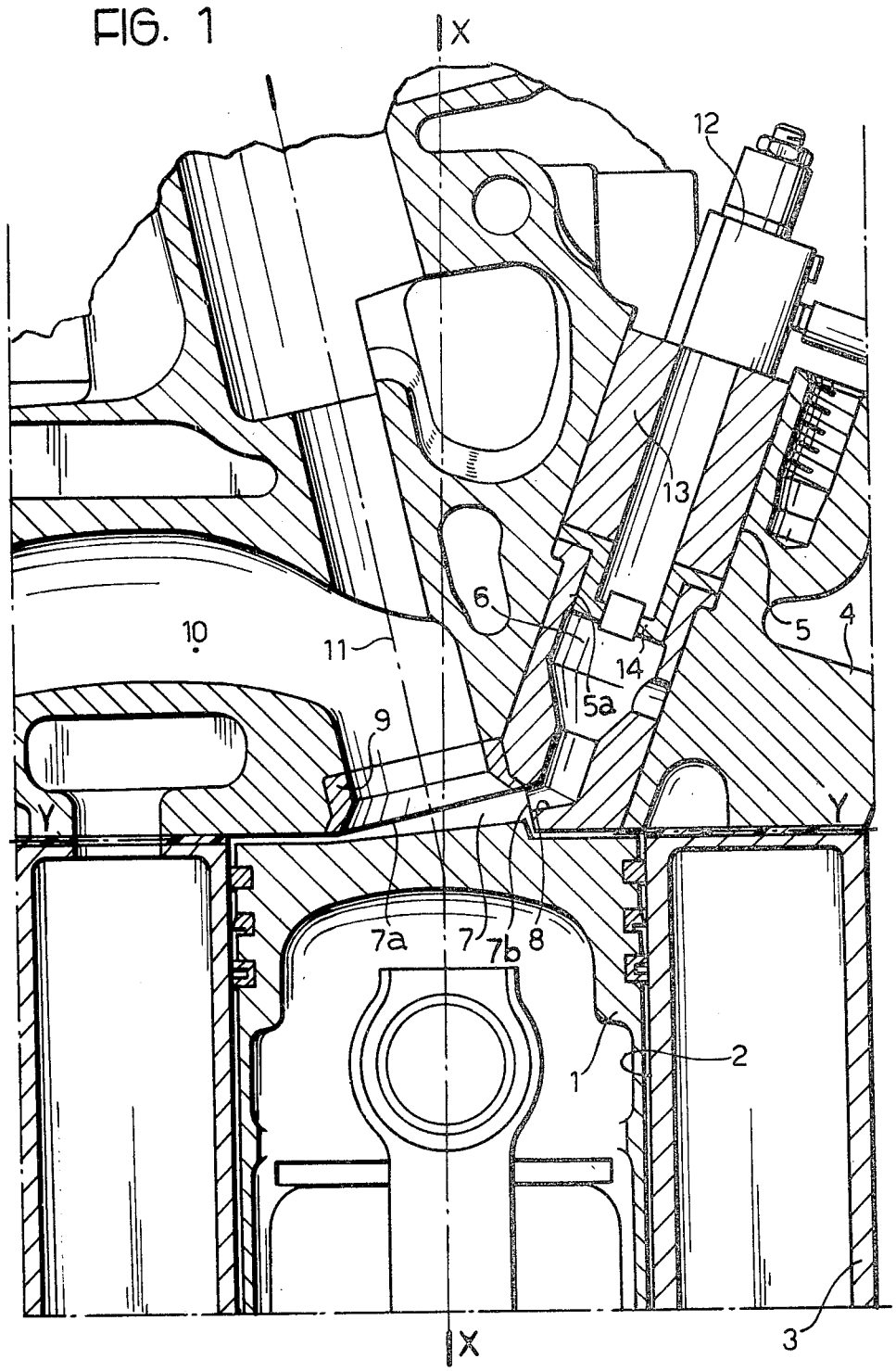
FIG. 1 is a schematic cross-sectional view of a part of an internal combustion engine incorporating the invention.

Referring first to the embodiment illustrated in FIG. 1, there is shown a reciprocating piston 1 in a cylinder 2 formed in a cylinder block 3. Above the cylinder block 3 is a cylinder head 4 for a compression-ignition cycle, and in the cylinder head 4 there is formed a cylindrical opening 5 which contains a metal insert 5a within which there is formed a precombustion chamber generally indicated 6 communicating with a substantially triangular recess 7 in the cylinder head through a duct 8.

The cylinder head 4 also has an exhaust valve seat 9 and an exhaust duct 10 for the gases burnt in the combustion chamber. The median axis 11 of the exhaust valve seat 9 is inclined at an angle in the region of 12° to the axis X—X of the cylinder 2 as will be discussed in greater detail below.

In the opening 5, above the insert 5a is housed a fuel injector 12 the position of which is determined by two spacers 13, 14.

The median axis of the cylindrical opening 5, which contains the insert 5a having the precombustion chamber 6, is situated to one side of the cylinder 2 and is inclined at 20°±5° with respect to the axis x—x of the cylinder 2. Although only the exhaust valve seat 9 is visible in the drawings it will be appreciated that the cylinder head 4 also has an inlet valve seat for the cylinder illustrated and, indeed, that there may be a plurality of such cylinders aligned with one another perpendicular to the plane of the paper. The median axes of all the valves of such cylinders would all lie in a common plane represented in FIG. 1 by the broken line 11 which, as mentioned above, lies at an inclination of 12°±5° to the axis x—x of the cylinder 2.

The recess 7 is intended to constitute the main portion of the combustion chamber of the engine when the piston 1 is in the top dead centre position and is open towards the cylinder 2. This recess has a substantially triangular profile in cross section, delimited above by a plane surface 7a orthogonal to the axis of the respective induction and exhaust valves of the engine which as mentioned above are parallel to one another. This plane surface 7a extends transversely part way across the diameter of the cylinder 2. In another embodiment (not shown) the surface 7a extends all the way across the cylinder 2 so that the triangular section recess 7 constitutes the whole of the combustion chamber when the pistion 1 is in the top dead centre position.

The side of the said combustion chamber is delimited, on the side where, because of its triangular conformation, it is of greatest height, by a plane wall 7b. An opening is formed in the said plane wall 7b, which opening communicates, by means of the duct 8, with the precombustion chamber 6.

Figure 2:
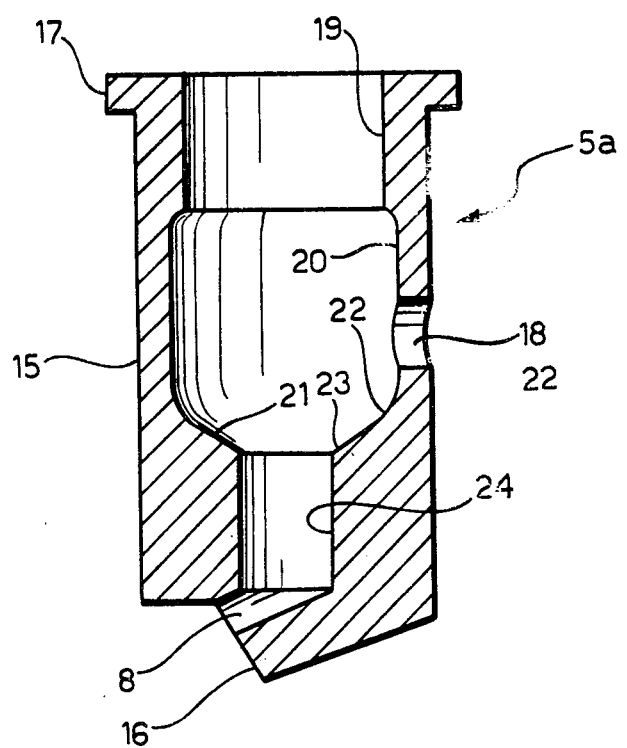
FIG. 2 illustrates, in more detail, a modified form of precombustion chamber for the cylinder head of an engine formed as an embodiment of the invention.

FIG. 2 shows, in detail, the metal insert 5a and the shape of the precombustion chamber formed in it. The insert comprises a central, hollow, substantially cylindrical body 15, a lower projection 16, and an upper flange 17. A transverse hole 18 in the side wall of the cylindrical body 15, permits communication of the precombustion chamber 6 with a glow plug (not shown) for preheating the air therein.

Internally of the body 15, the precombustion chamber 6 comprises a first substantially cylindrical chamber 20 and a second substantially cylindrical chamber 24 which is of smaller diameter than the first chamber 20 and which is joined to the first chamber 20 by a frusto--conical shoulder portion 23 which blends into the upper chamber 20 with smooth curves 21, 22. At its lower end, the smaller cylindrical chamber 24 opens into a duct 8 which extends in a direction away from the transverse hole 18 towards the combustion chamber 7 of the engine illustrated in FIG. 1. The duct 8 is inclined by about 120° with respect to the median axis of the precombustion chamber.

Between the cylindrical chamber 20 and the end flange 17 there is a cylindrical bore 19 the dimensions of which are suitable to receive the end of the fuel injector with its associated flame guard.

The inclination of the duct 8 mentioned above is particularly advantageous in as much as the flame front coming out from it acquires rotational components in the combustion chamber 7 thus inducing turbulence which assists in obtaining complete combustion of the fuel. The precombustion chamber is thus constituted by the two cylindrical parts 20, 24 and the frusto-conical part 23 downstream of the bore 19 which houses the fuel injector and its flame guard.

The overall volume of the precombustion chamber lies between 40% and 60% of that of the combustion chamber, and the volume of the first cylindrical part 20 of the precombustion chamber is 85% of the overall volume of the whole precombustion chamber. This is advantageous in that it allows complete combustion of the air/fuel mixture to take place in the first chamber 20, and for the flame front to be directed into the second cylindrical chamber 24.

FIG. 3 illustrates a second embodiment of the invention in which there is a reciprocally movable piston 101 in a cylinder 102 formed in a cylinder block 103. A recess 104 is formed in the otherwise flat crown 104a of the piston and is located close to one of the sides of the piston. A gasket 106, positioned between the upper face of the cylinder block 103 of the engine and a plane bearing face 107 of a cylinder head 105 of the engine provides for gas tight sealing of the cylinder, preventing the escape of gases generated during the firing stroke of the engine.

In the cylinder head 105, is formed a bore 108 which receives and supports an insert 108a within which is formed a precombustion chamber 109; the bore 108 is situated laterally of the axis x—x of the cylinder 102 and extends parallel to it.

The recess 104 in the piston 101 is open upwardly, towards the cylinder head 105 of the engine, and faces the plane bearing face 107; it is formed substantially in the shape of a part-spherical bowl. The cylinder head is also provided with inlet and exhaust valves for each cylinder. Only one valve, the axis of which is indicated with the numeral 111 can be seen in the drawing. The axes of the valves are all parallel to one another and to the axis x—x of the cylinder which is orthogonal to the plane bearing face 107 of the cylinder head, such that the said plane bearing face 107 will also be orthogonal to the axes of the valves.

The recess 104 in the piston crown constitutes the main part 104a of the combustion chamber when the piston is at the top dead centre position. The metal insert 108a in which the precombustion chamber 109 is formed is of substantially the same form as illustrated in FIG. 2 and has a lower projection with an inclined duct 114 for the transfer of fuel from the precombustion chamber 109 to the combustion chamber 104a, the lower part of the insert 108a projecting into the said main part 104a of the combustion chamber.

The overall volume of the combustion chamber is thus defined by the plane bearing face 107 of the cylinder head 105, by the plane part of the crown of the piston 101, by the concave surface of the spherical bowl 104 in the crown of the piston, and by the lower projection of the metal insert 108a in which the precombustion chamber 109 is formed, which projection penetrates into the part-spherical recess in the piston crown.

A very important advantage which can be obtained in an engine having the features of the invention is that of having, in addition to a single output for the burning gas after initial combustion in the precombustion chamber, also a combustion chamber the cross section of which decreases with distance from the precombustion chamber. In this way it is possible to obtain an increase of the velocity gradient of the flame front, which induces a greater turbulence at the periphery of the cylinder, enabling more complete combustion to take place in those regions of the combustion chamber further from the injector.

What is claimed is:

1. In a diesel cycle internal combustion engine of the type having:
   at least one cylinder,
   a cylinder head,
   a metal insert in said cylinder head,
   means defining a cavity in said metal insert in said cylinder head, said cavity constituting a precombustion chamber for said engine,
   a fuel injector, said fuel injector extending into said metal insert in said cylinder head and closing said cavity from above,
   the improvement wherein said precombustion chamber is formed in two parts,
   means defining a first part of said precombustion chamber being of substantially cylindrical form and having a frustoconical portion at the downstream end thereof,
   means defining the second part of said precombustion chamber also being of substantially cylindrical form wherein the volume of said first part of said precombustion chamber constitutes 85% of the overall volume of said precombustion chamber, and the volume of said second part represents the remaining 15% of this overall volume,
   said first and said second parts of said precombustion chamber communicating with one another through said frustoconical portion at the downstream end of said first part,
   a combustion recess in said head having a substantially triangular profile in cross-section, and
   means defining a single duct for the discharge of gases produced as a result of combustion in said precombustion chamber, said duct communicating the end of said recess having the greatest cross-section with the end of the said second part of said precombustion chamber opposite to the said first part thereof and having an inclination in the region of 120° with respect to the longitudinal axis of said cylindrical first and second parts of said precombustion chamber, said cylindrical parts being coaxial with one another and said metal insert has a hole in the side wall thereof at a position substantially midway of the axial length of said first part of said precombustion chamber adapted to receive a glow-plug, the said hole having its longitudinal axis directed perpendicularly to the longitudinal axis of said first part of said precombustion chamber.

* * * * *